April 1, 1952     B. H. STAUFFER     2,591,212
LEG AND ANKLE MASSAGE TABLE APPARATUS
Filed Dec. 29, 1947     4 Sheets-Sheet 1

INVENTOR.
Bernard H. Stauffer
BY

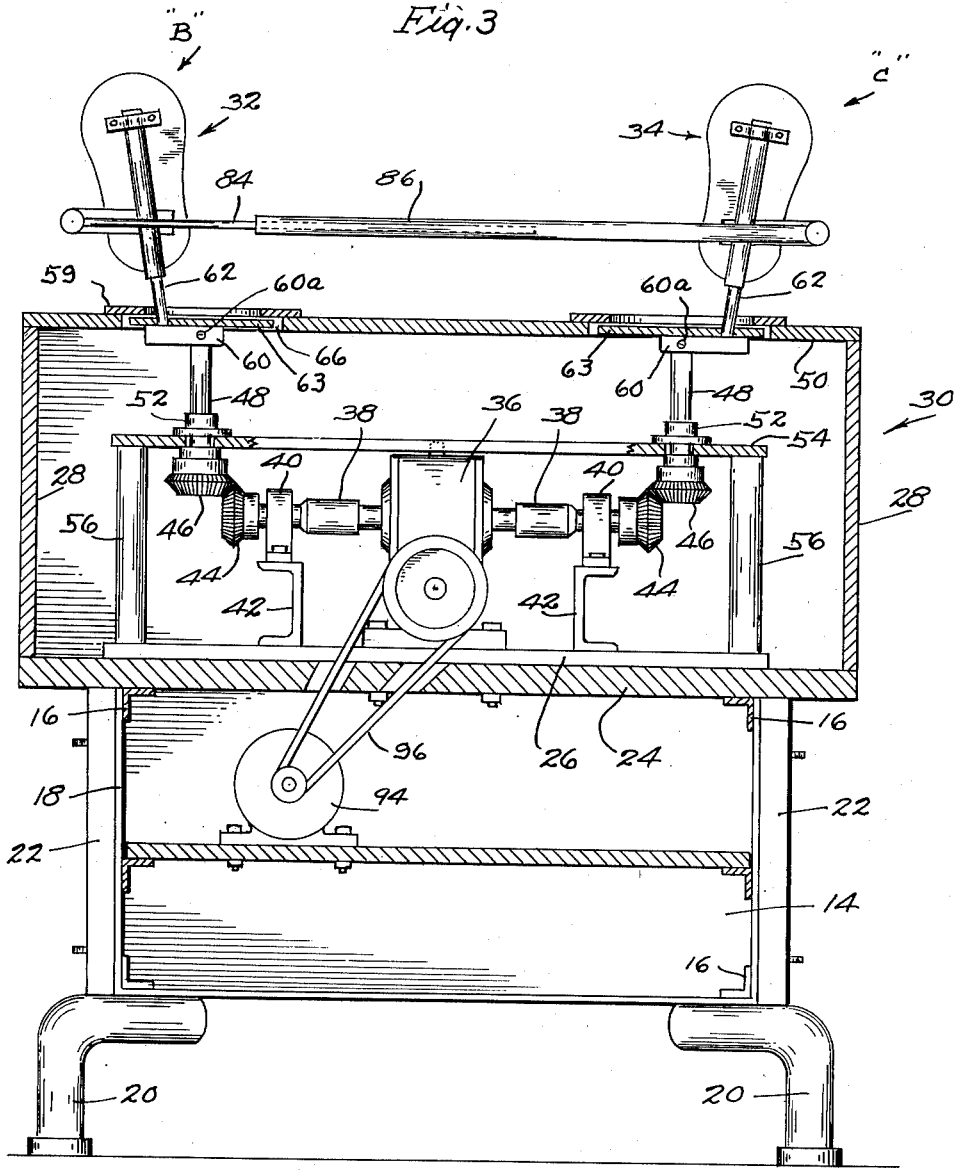

April 1, 1952     B. H. STAUFFER     2,591,212
LEG AND ANKLE MASSAGE TABLE APPARATUS
Filed Dec. 29, 1947     4 Sheets-Sheet 3
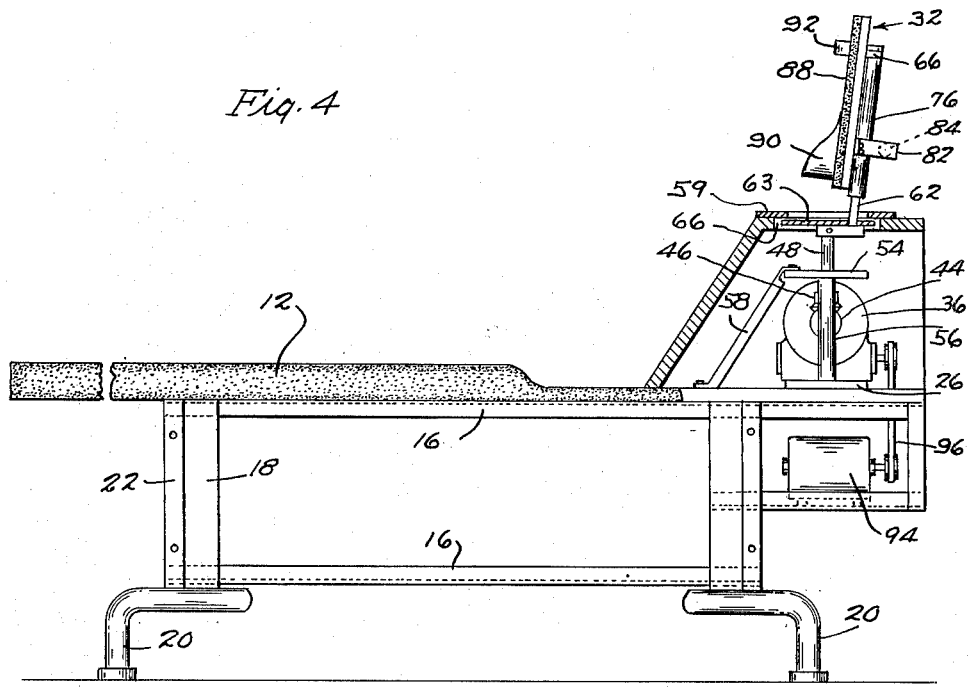
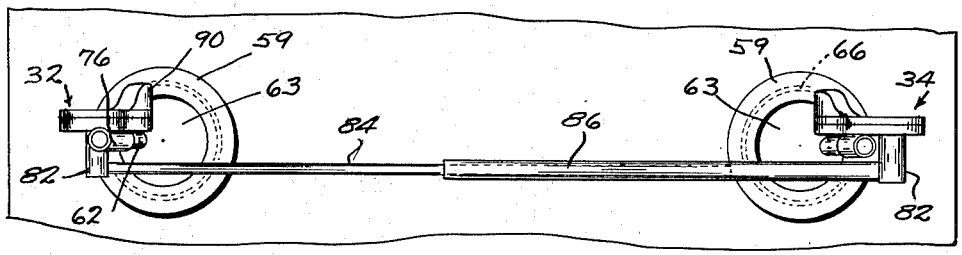
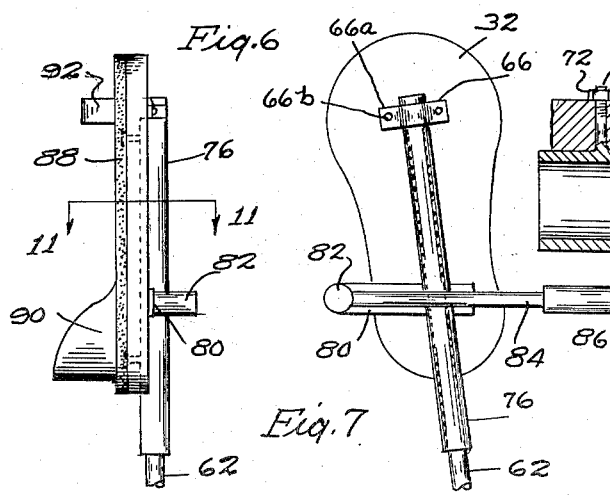
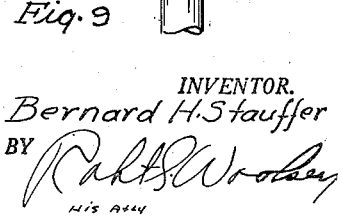
INVENTOR.
Bernard H. Stauffer

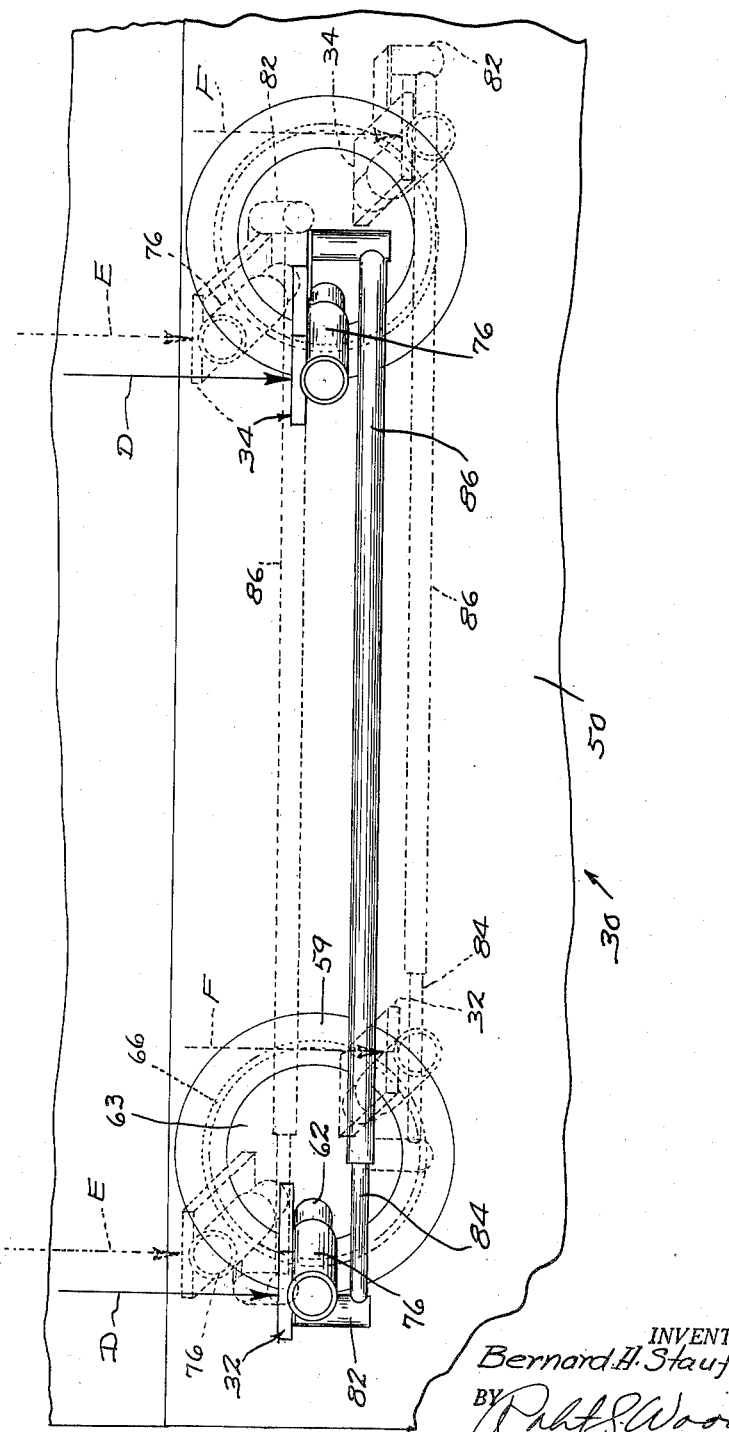

Patented Apr. 1, 1952

2,591,212

UNITED STATES PATENT OFFICE 2,591,212

LEG AND ANKLE MASSAGE TABLE APPARATUS

Bernard H. Stauffer, Los Angeles, Calif.

Application December 29, 1947, Serial No. 794,253

13 Claims. (Cl. 128—46)

1

The object of the invention is to provide a new and useful mechanical massage apparatus adapted to effectively stimulate circulatory action in the legs and ankles of those persons who are afflicted with faulty circulation of these parts whereby normal vigor thereof is restored to a great extent.

Another object of the invention is to provide a novel and efficient massage apparatus whereby the lower extremities may be massaged to restore muscular vigor following impairment of tissue as a consequence of impaired nerve control thereof, and/or for other cause.

An advantage of the apparatus resides in simplicity of construction and unfailing functional operation thereof.

A further advantage of the invention resides in the fact that the applicators may be arranged to obtain a concurrent inturning movement of the feet and ankles through a rotating course, or may be adjusted to obtain a concurrent out-turning of the feet and ankles, or may be further adjusted to obtain a pull and push action in opposite directions with respect to the feet concurrently with a yawing movement through a circular course whereby full and complete massage of the lower extremities may be had.

Other significant objects, features and advantages of the invention may be noted from the accompanying drawing, the specification and the subjoined claims.

In the drawing of which there are four sheets:

Figure 3 is an elevational view taken along line 3—3, Figure 1, showing construction of the apparatus in detail.

Figure 4 is a view partially in section showing the apparatus in side-view.

Figure 5 is a top-plan view of the foot applicators in relation to a fragment of the housing therefor.

Figure 6 is a side-elevational view of one of the applicators.

Figure 7 is an elevational view showing the rear or back side of the applicator shown in Figure 6.

Figure 8 is a view showing the applicators in several of the progressive positions through which the applicators cyclically move to impart an oscillatory motion to the legs and ankles and wherein the resulting movement is that of compression, elongation and a yawing or rolling motion adapted to stimulate impaired nerve, muscular and circulatory action.

Figure 9 is a sectional view through a foreshortened tubular sleeve showing the manner of securing an applicator thereto.

Figure 10 is a view showing a fragment of one

2 of the applicator shafts having an annular groove therein which is adapted to receive a half-collar secured to and extending from an applicator as a means to hold the applicator in a constant elevation.

Figure 1:
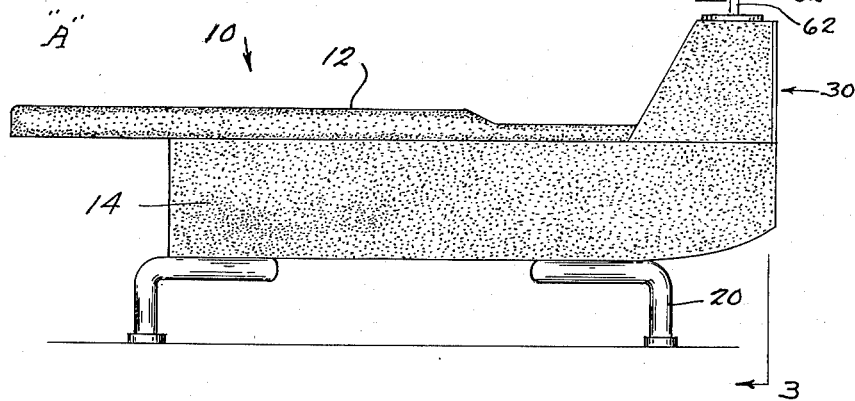
Figure 1 is a side-elevational view of a massage table incorporating the present invention.
Figure 2:
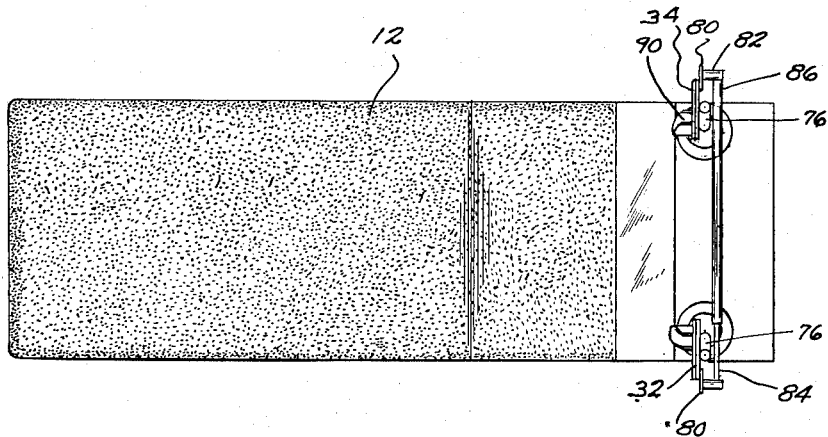
Figure 2 is a top-plan view of the above described table including the foot applicators.
Figure 11:
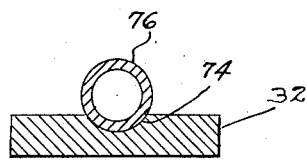

Figure 11 is a sectional view taken along line 11—11, Figure 6, showing the longitudinal groove in the applicators as a means of forming a saddle-like union with the tubular sleeve.

In the drawing the reference character 10 indicates a couch-like structure having a padded upper surface 12 and side panels 14, all supported upon a frame comprising horizontal angle irons 16 and intermediate risers 18, which are welded to legs 20 at each of the four corners of the structure 10. Elongated blocks of wood 22 are secured to the outer faces of the plates 18 and serve as spacers and supports for the panels 14 with respect to the frame assembly.

A relatively heavy and preferably plywood plank 24 is laid across the top surfaces of the upper horizontal angle irons to serve as a base for the padded couch-like surface 12.

At the foot of the table I place a metal plate 26 the ends of which are equally spaced with respect to the sides 28 of the box-like structure 30 used to encase the power and gear apparatus designed to actuate the foot applicators 32 and 34. Centrally upon the plate 26 I locate a speed reduction gear box 36 having driven shafts 38 which extend through the bearings 40, which are supported upon short lengths of channel iron 42. Upon the ends of the shafts 38 I place beveled gears 44 which are in mesh with mated gears 46 and from which latter gears, vertical shafts 48 extend to a point adjacent the under surface of the top member 50 of the box structure 30.

As will be noted the shafts 48 are journalled in bearings 52 located upon a metal plate 54 which is in companion relationship to the plate 26 and which is supported upon and spaced from the plate 26 by means of tubular spacers 56. Diagonal braces 58 are adapted to steady the aforedescribed structure, especially when under stress imposed by functional use of the apparatus.

Upon the extreme upper ends of each of the vertical shafts 48 I place relatively short rectangular iron bars 60 which are detachably secured thereto for adjustment purposes, while at the opposite end of these bars I fixedly secure a length of round shafting 62 which is inclined from the vertical through an angle of approximately 9 degrees and which inclination extends outwardly in a plane in longitudial alignment with the greater axis of the bars 60.

Applicators 32 and 34 are formed with a shallow circular groove 74 extending partially the length thereof to receive a tubular sleeve 76 through which the inclined shafts 62 extend and, as shown in Figure 9, the sleeves are bolted at 70 to the applicators and secured thereon by means of nuts 72.

The shafts 62 are also formed with an annular groove 64 adjacent the upper ends thereof and are adapted to receive a half-round collar 66 having divergent free end portions 66a for attaching to the applicators by means of screws 66b, thus affording means to hold the applicators in a constant elevation upon the shafts 62 while at the same time permitting free relative rotation within the sleeves.

Upon the heel portion of the applicators 32 and 34 I mount tubular sleeves 82 which are suitably secured thereon for limited oscillatory movement and, to the sleeve 82 on the applicator 32 I secure a rod 84 and, to the sleeve 82 on the applicator 34 I secure a tube 86 into which the rod 84 is slidably fitted for telescopic union and relative movement; whereby, upon moving in divergent directions, the rod and tube remain mated with respect to one another and being thus united will hold the applicators in positional paired union, which position is that of face alignment with the longitudinal axis of the apparatus so that the feet of a user will rest fully thereagainst.

As shown in the drawings, the applicators 32 and 34 are provided with a padded facing 88 against which the feet of a patron are adapted to bear when placed in the heel support socket 90 and confined thereto by means of a toe strap 92.

A motor 94 operating through a belt drive 96 is adapted to supply power to operate the apparatus, the motor being controlled by means of a conventional switch and circuit connected with a power source, but which elements are not shown in the drawing, for the reason that they form no part of the present invention. The openings 66 through which the shafts 62 extend and through which they swing in circuitous travel, are covered by circular discs 63 secured upon the bars 60, and, the annular space between these discs and the side-walls of the openings 66 are covered by means of an over-hanging collar 59 for each thereof, which collars are fixedly secured to the top plate 50 of the box structure 30.

Functional use and operation of the apparatus will now be described, however, before proceeding with this description, it may be here stated that the applicator assembly B and C may be adjusted upon the shafts 48 to provide a massage action in accordance with the particular individual requirements of a patron by loosening the set screw 60a and then swinging the bar 60 to such position as may be deemed most appropriate, that is, they may be set to extend in divergent directions as shown in Figures 3 and 5, or they may be set to move simultaneously in the same direction, as shown in Figure 8, or in any position intermediate or variant thereof.

Assuming that the applicators are adjusted and set in alignment with one another as shown in Figure 8, and that a patron is lying upon the couch 10 with the feet bearing upon the face 88 of the applicators 32 and 34, it is only necessary to energize the motor 94 and the intermediate driving train thereof to rotate the shafts 48, the bars 60 and the inclined or non-vertical shafts 62 in a circular course of travel around the medial vertical axis of the driven shafts 48.

Depending of course upon the point of beginning, this motion carries the applicators laterally (see full lines Figure 8) of the longitudinal axis of the couch 10, then swings toward the couch, then laterally with respect thereto, and then in a direction from the couch. Since the feet are secured in the applicators, the ankles are turned to the right and to the left, and are flexed both inwardly upon themselves and outward with respect thereto so that the muscles of these parts are massaged by flexure in a manner which constitutes one of the best physio-therapy practices, and is of very considerable aid in restoring normal tone and vigor thereto. Likewise, the abductor and femur muscles are stretched and relaxed within the best known massage practice.

In Figure 8 the arrows D indicate a lateral position of the applicators, a position wherein the feet are moved in a yawing course to the right and to the left. The arrows E indicate movement of the applicators toward the patron, a movement which crowds or compresses the muscles of the parts upon themselves due to resistance by the body to being moved, while the arrow F indicates a position in which the feet are stretched outwardly with the ankle as a fulcrum point, this position, as well as the positions E and D together with intermediate positions thereof, serve as aforementioned to simultaneously stretch and relax and compress certain of the muscles of the feet, the ankles and the legs with the end result that the lower extremities are thoroughly, yet gently massaged with the known benefit which flows from a good and thorough massage.

Wherefore, having described my massage apparatus in its preferred form, that which I desire to protect by Letters Patent is:

1. In an apparatus for massage of the legs and ankles, a pair of applicators for movement in an inclined, cyclical orbit, a sleeve fixedly connected to each of said applicators, an inclined shaft in relative rotational union with each of said sleeves, telescopic means to hold said applicators in face parallelism in functional use, a horizontal arm to support each of said inclined shafts, and a vertically disposed shaft connected to each of said horizontal arms, and power means to rotate said last mentioned shafts whereby upon rotation thereof, said inclined shafts carry said applicators through a circular course of travel which imparts a stretching, compressing and torque-like movement to the muscles of the legs and ankles in amplification of normal tolerance thereof not to exceed the angular inclination of the applicators.

2. In an apparatus for massage of the legs and ankles, said apparatus including a couch-like structure for the body and having a pair of applicators for the feet, said applicators being swivelly positioned upon inclined shafts, a horizontal arm for support of each of said inclined shafts, and a vertically disposed rotatable shaft for each of said horizontal arms, and telescopic means connecting said applicators whereby the applicators are held in paired alignment against relative movement axially of said inclined shafts, and power means to rotate said vertical shafts whereby the applicators carry the feet in a yawing circular course adapted to stretch, twist and compress the muscles of the ankle and lower leg.

3. In an apparatus for massage of the legs and ankles including a couch-like structure for repose of the body, applicators, cyclically movable inclined shafts, said applicators being swivelly supported upon said cyclically movable inclined shafts, means co-operable with the applicators arranged to hold the faces thereof substantially at right angles to the longitudinal axis of the couch structure, and means to repetitiously actuate the inclined shafts cyclically.

4. In a massage apparatus, a pair of applicators having faces upon which the feet bear and by which the feet are supported for massage purposes, a cyclically movable shaft in non-vertical position for each of said applicators, means interposed between said non-vertical shafts and said applicators arranged for swiveled union thereof, means to hold said applicators in face alignment with the longitudinal axis of said apparatus, and means to rotate said applicators through a circular path of travel, said means including vertically disposed rotatable shafts having horizontal bars thereon, the horizontal bars being arranged for support of said non-vertical shafts.

5. In a massage table apparatus, a pair of applicators so constructed and arranged that the feet may be supported thereon, non-vertical cyclically movable shafts in swiveled union with said applicators, means to non-rotatingly swing said applicators through a circular travel orbit, said means comprising driven shafts having horizontal bars interposed between said driven shafts and said non-vertical shafts, and telescopic tubular means connected to said applicators arranged to hold the applicators in positions of like disposition.

6. In an apparatus for massage of the legs and ankles, a pair of applicators, said applicators including a sleeve attached to each thereof and an inclined shaft in each of the sleeves arranged for non-rotational circular movement, said shafts being arranged to swing through a circular course of travel in an angular inclination of approximately 9 degrees from the vertical whereby a movement of the legs and ankles is had from a condition of non-stress to a condition under stress in all cyclical positions of the applicators, and means to operate said apparatus in functional use.

7. In an apparatus of the character described, means to carry the feet in a yawing circular course of motion adapted to stretch, twist and compress the muscles of the lower leg, ankles and feet, said means comprising inclined shafts having a swivelled support on each thereof to which the feet may be releasably secured and means to swing said inclined shafts through an orbit of travel, said means comprising a driven shaft and a horizontal arm for each of the inclined shafts, said arms being arranged to support said inclined shafts in a position of fixed angularity with respect to the horizontal, said driven shafts being connected for actuation by a power source in common therewith.

8. In a massage apparatus of the character described including a body support structure, means to carry the feet in a yawing circular course of travel adapted to stretch, twist and compress the muscles of the lower legs, ankles and feet, said means comprising a pair of foot support applicators and a shaft in swivelled connection with each of the applicators, a driving means connected to said shafts arranged to swing each of said shafts and applicators through a circular course of travel, and means cooperable with said applicators arranged to hold the applicators in paired alignment with respect to one another.

9. The combination in a massage apparatus of the character described having a support structure for horizontal repose of the body and including a case upon an end thereof adapted to house an operating mechanism, of a pair of foot support applicators, a non-vertical shaft in swiveled union with each of said applicators arranged for elevated support thereof, an axially rotatable driveshaft for each of said non-vertical shafts and the applicators thereon, a bar arranged to hold each of the non-vertical shafts in off-set relationship to its drive shaft and being adapted upon rotation of the drive shafts to carry the non-vertical shafts and applicators through a circular orbit of travel whereby said applicators are caused to recurrently incline toward, away from, and laterally of a person on said support structure in a yawing movement adapted to stretch, twist and compress the muscles of the lower leg, ankle and feet.

10. The structure defined in claim 9, including, said apparatus being provided with means adapted and arranged to hold said applicators in paired positional aligned relationship with respect to one another.

11. The structure defined in claim 9, including telescopic means cooperable with said applicators adapted and arranged to hold the applicators in paired alignment with respect to one another.

12. The structure defined in claim 9, including, a tube connected to one of the applicators and another tube connected to the other of the applicators, said tubes being slidably connected for telescopic movement adapted to horizontal self-alignment of each thereof concurrently with actuation of the applicators whereby the applicators are caused to be in paired alignment with respect to one another.

13. In a massage apparatus of the character described including a body support structure having a head end and a foot end, a housing upon said structure at the foot end thereof adapted to enclose an operating mechanism, said housing being formed with apertures in the top surface thereof, said operating mechanism being provided with stub shafts projecting through said apertures, an applicator for support of a foot swiveled upon each of said stub shafts, an axially rotatable shaft for each of said stub shafts, means adjustably attached to the axially rotatable shafts arranged to support the stub shafts in an angular position of inclination of approximately 9 degrees with respect thereto, unitary means connected to the axially rotated shafts for actuation thereof, and a closure for said apertures, said axially rotatable shaft and said adjustable means being so co-related that upon actuation thereof applicators upon said stub shafts are moved in a circular pawing orbit of travel within said apertures.

BERNARD H. STAUFFER.

REFERENCES CITED

The following references are of record in the file of this patent:

UNITED STATES PATENTS

| Number | Name | Date |
|---|---|---|
| 2,004,671 | Nelson | June 11, 1935 |
| 2,114,322 | Shafer | Apr. 19, 1938 |
| 2,206,902 | Kost | July 9, 1940 |

FOREIGN PATENTS

| Number | Country | Date |
|---|---|---|
| 314,669 | Germany | Aug. 8, 1919 |